(12) United States Patent
Raio et al.

(10) Patent No.: US 9,072,401 B2
(45) Date of Patent: Jul. 7, 2015

(54) GRIDDLE HAVING RAISED, BUN TOASTING SURFACE

(75) Inventors: Steven Raio, Canyon Lake, CA (US);
Juan M. Martinez, Corona, CA (US);
Harry Springer, III, Cypress, CA (US);
Michael Cole, Temecula, CA (US)

(73) Assignee: Stearns Product Development, Inc., Perris, CA (US)

( * ) Notice: Subject to any disclaimer, the term of this patent is extended or adjusted under 35 U.S.C. 154(b) by 407 days.

(21) Appl. No.: 13/458,911

(22) Filed: Apr. 27, 2012

(65) Prior Publication Data

US 2013/0112089 A1 May 9, 2013

Related U.S. Application Data

(63) Continuation-in-part of application No. 12/840,431, filed on Jul. 21, 2010.

(51) Int. Cl.
| | |
|---|---|
| *A47J 37/00* | (2006.01) |
| *A47J 37/06* | (2006.01) |
| *A47J 37/10* | (2006.01) |

(52) U.S. Cl.
CPC ............... *A47J 37/067* (2013.01); *A47J 37/10* (2013.01)

(58) Field of Classification Search
CPC . A47J 37/067; A47J 37/0676; A47J 37/0682; A47J 37/10
USPC ............................................. 99/422, 428, 425
See application file for complete search history.

(56) References Cited

U.S. PATENT DOCUMENTS

| | | | | |
|---|---|---|---|---|
| 2,601,822 | A | * | 7/1952 | Hopkins .......................... 99/339 |
| 3,651,796 | A | * | 3/1972 | Nelson ............................ 126/215 |
| 3,948,159 | A | * | 4/1976 | Vigerstrom ..................... 99/358 |
| 5,131,320 | A | * | 7/1992 | Jensen et al. .................... 99/422 |
| D331,524 | S | | 12/1992 | Buday |
| 5,240,124 | A | | 8/1993 | Buday |
| 5,417,149 | A | | 5/1995 | Raio et al. |
| 6,031,209 | A | * | 2/2000 | Wiesman ................... 219/447.1 |
| 6,050,176 | A | * | 4/2000 | Schultheis et al. .............. 99/339 |
| 6,263,786 | B1 | | 7/2001 | Raio et al. |
| 6,332,768 | B1 | | 12/2001 | Raio et al. |
| 6,467,400 | B2 | | 10/2002 | Raio et al. |
| 6,736,051 | B2 | | 5/2004 | Frantz et al. |
| 6,772,681 | B1 | | 8/2004 | Raio et al. |
| 2005/0217496 | A1 | * | 10/2005 | Dodgen ........................... 99/422 |
| 2012/0017774 | A1 | | 1/2012 | Martinez et al. |

* cited by examiner

*Primary Examiner* — Reginald L Alexander
(74) *Attorney, Agent, or Firm* — Stetina Brunda Garred & Brucker

(57) ABSTRACT

An apparatus for caramelizing a cut surface of a split bread product is provided. The apparatus comprises a substantially flat heatable surface and at least one pedestal magnetically coupled to and in heat transfer communication with the flat surface, and extending upwardly therefrom. The pedestal defines an upper contact surface for receiving and supporting the split bread product. The contact surface is formed to substantially conform to the contour of the cut surface of the split bread product, to apply heat directly to the cut surface to caramelize the inner surface thereof.

29 Claims, 7 Drawing Sheets

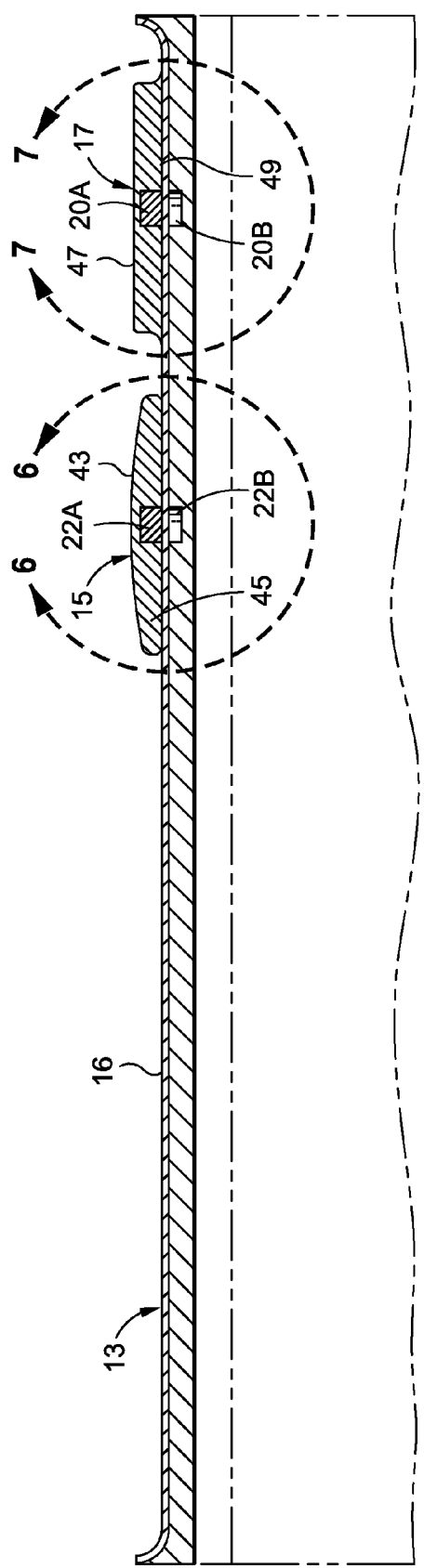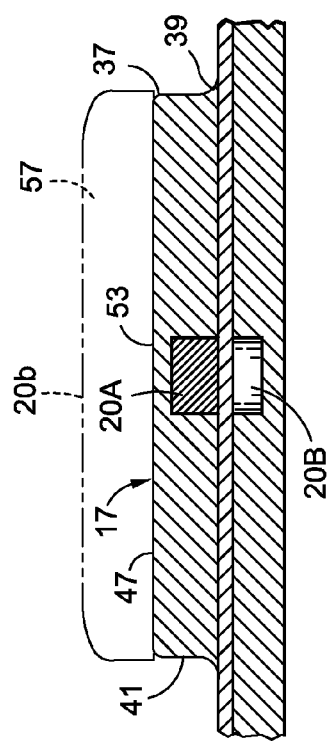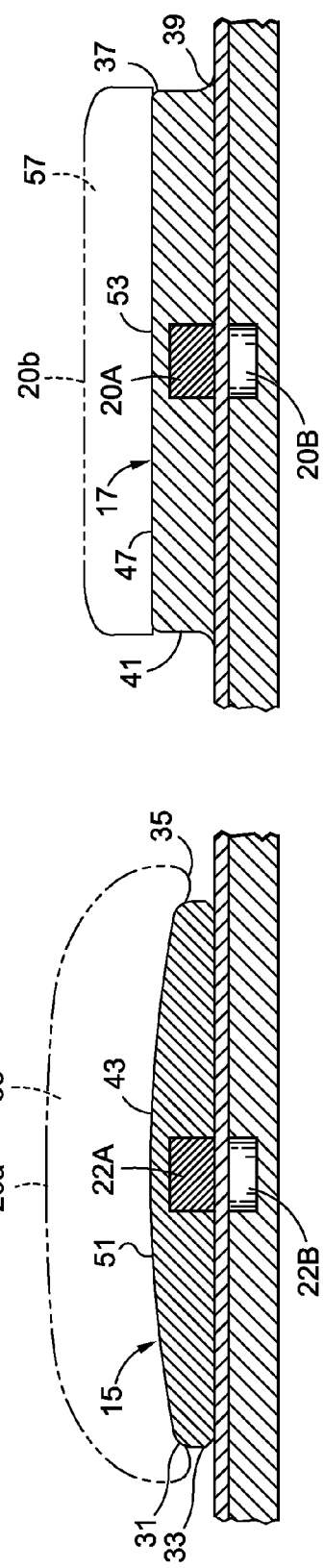
FIG. 5
FIG. 6
FIG. 7

GRIDDLE HAVING RAISED, BUN TOASTING SURFACE

CROSS-REFERENCE TO RELATED APPLICATIONS

This application is a continuation-in-part of U.S. patent application Ser. No. 12/840,431, filed Jul. 21, 2010, assigned to the common assignee.

STATEMENT RE: FEDERALLY SPONSORED RESEARCH/DEVELOPMENT

Not Applicable

BACKGROUND

The present invention relates to an apparatus for grilling or searing the inner surfaces of baked bread products, such as buns, in order to enhance the flavor of the product and to mitigate the migration of liquids, e.g. juices, sauces, etc., into the body of the bread product.

Sandwiches, burgers and the like are frequently served on toasted buns. Toasting enhances the texture and flavor provided by the bun. Buns are commonly toasted by means of a toaster, or by placement on a barbeque griddle. However, the toasting process may dry out the bun, which may be undesirable to the taste of some.

Buns can be partially toasted or seared by briefly placing the split bread product on a flat heated surface, e.g. a griddle. Such partial toasting or searing may be effective to caramelize the inner surfaces of the bun, while allowing the body portions of the bun to remain bakery fresh in texture, flavor and appearance. In addition to providing flavor and texture to the taste of the bun, the caramelization may also be effective to mitigate the migration of juices and sauces from the burger, vegetables, etc., into the body of the bun, keeping the bun from quickly becoming soggy as the burger or sandwich awaits consumption.

Some bread products, such as buns and rolls, have been found to have a somewhat arcuate inner surface after splitting. As such, simply placing the bun or roll on a flat heated surface may well result in caramelizing only the outer edges of the bun or roll, leaving the inner surfaces substantially un-caramelized. In such a case, the cut surfaces of the bun do not have a caramelized flavor or texture, and meat and vegetable juices can more readily migrate into the body of the bun or roll, making it soggy.

In some cases a press or weight is placed on the bun to urge the cut surface of the bun into contact with the heated surface, caramelizing the inner surface of the bread product. However, the process typically distorts the visual appearance of the bun, and distorts the texture of the bun so the body is not longer bakery fresh in taste.

U.S. Pat. No. 6,736,051 to Franz et al discloses a Floating Clamshell Griddle Toaster which allows for toasting a bun or roll on a flat heated surface. The disclosed device includes a series of vertically translatable pins, which apply slight weight onto the bun to urge the inner surface into contact with the heated flat surface, without distorting or compressing the bun to significant levels. The apparatus disclosed in the patent is effective to form a caramelized layer across the inner surface of the bun while maintaining the delicate shape and texture of the bun. However, the mechanical complexity of the device and the need for properly sizing and mating the pin plate to the griddle surface are factors limiting its practical use.

Accordingly, it is an object of the present invention to provide an apparatus and method effective to caramelize the inner surfaces of split bread products in a manner that is readily usable on a variety of different cooking surfaces.

It is a further object of the invention to provide an apparatus and method for caramelizing the inner surfaces of split bread products without distorting the appearance or texture of the body of the product.

It a further object of the invention to provide such an apparatus and method which is readily adaptable to different sizes and shapes of bread products.

BRIEF SUMMARY

An apparatus for caramelizing a cut surface of a split bread product is provided. The apparatus comprises a substantially flat heatable surface, and at least one bun toasting pedestal, magnetically coupled to and in heat transfer communication with the heatable surface, and extending upwardly therefrom. The pedestal defines an upper contact surface for receiving and supporting the split bread product. The contact surface is formed to conform to the contour of the cut surface of the split bread product, to apply heat directly to the cut surface to caramelize the inner surface thereof. In a preferred embodiment the pedestal contact surface defines an arcuate surface. In alternate embodiments the contact surface may be formed to be less arcuate, or substantially flat.

The pedestals are preferably formed as separate elements which are in heat transfer communication with the heated surface. In a preferred embodiment a film or other layer of non-sticking material, e.g. Teflon®, is disposed intermediate the pedestal(s) and heated surface.

In the preferred embodiment the pedestal(s) is removable from the heated surface to facilitate cleaning of the heated surface and/or the layer of non-stick material.

The pedestal surface contact may be formed in different shapes to conform to the bread product being caramelized, e.g. a circular bun, a square bun, or an elongated roll.

The pedestal contact surface may be sized and shaped to be slightly smaller than the perimeter of the bun, so that the bun edge portion extends beyond the raised surface portion. In alternate embodiments, the pedestal surface contact may be co-extensive with or slightly less than the cut surface of the split bread product.

The pedestal contact surface portion may define an outer perimeter having a curved edge extending thereabout to facilitate receipt and engagement of the split bread product on the raised surface portion.

Because the top and bottom surfaces of the split bread product may define different contours after splitting, the raised surface portions may be formed differently to caramelize top and bottom surfaces of a bun or other product. For example, the pedestal contact surface for receiving a bun top portion is preferably more arcuate than the pedestal contact surface formed to engage a bun bottom portion. In some cases the pedestal contact surface for receiving a bun bottom portion may be formed to be substantially flat.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 5 is a sectional view of an exemplary pedestal magnetically coupled to the heated surface;

FIG. 6 is an enlarged sectional view of a portion of FIG. 3;

FIG. 7 is an enlarged sectional view of a another portion of FIG. 3;

DETAILED DESCRIPTION

The above description is given by way of example, and not limitation. Given the above disclosure, one skilled in the art could devise various other embodiments that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
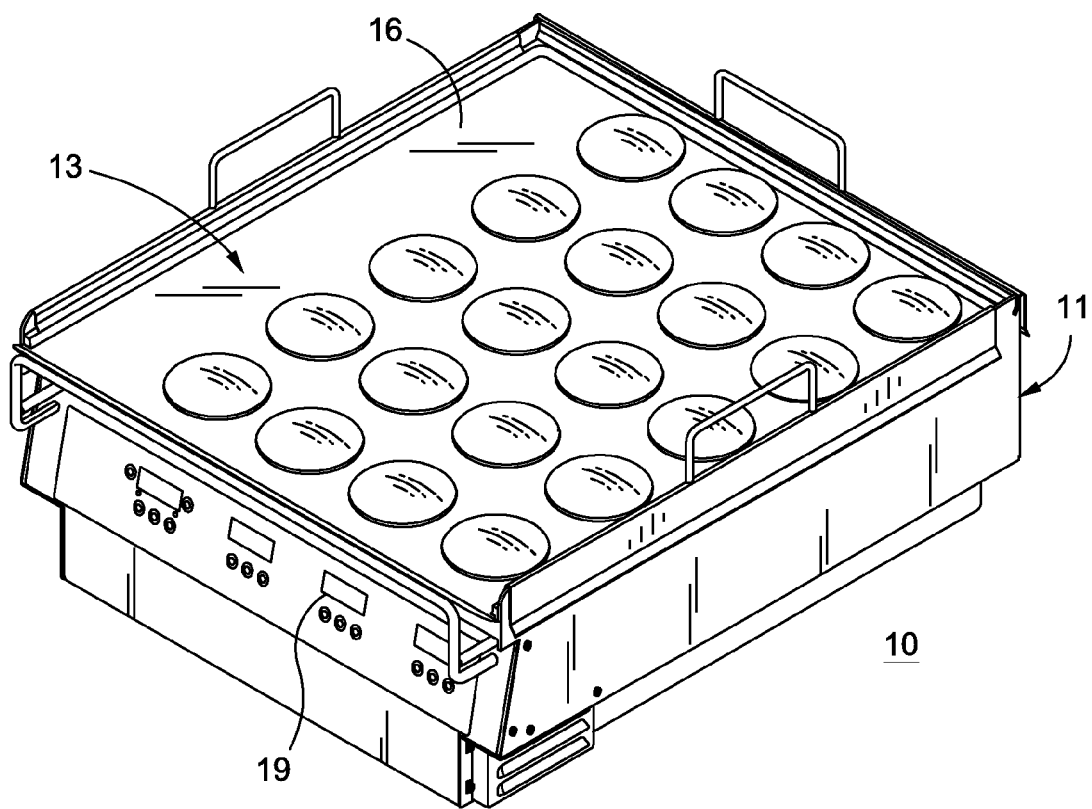
FIG. 1 is a front perspective view of an apparatus constructed in accordance with the present invention.
Figure 3:
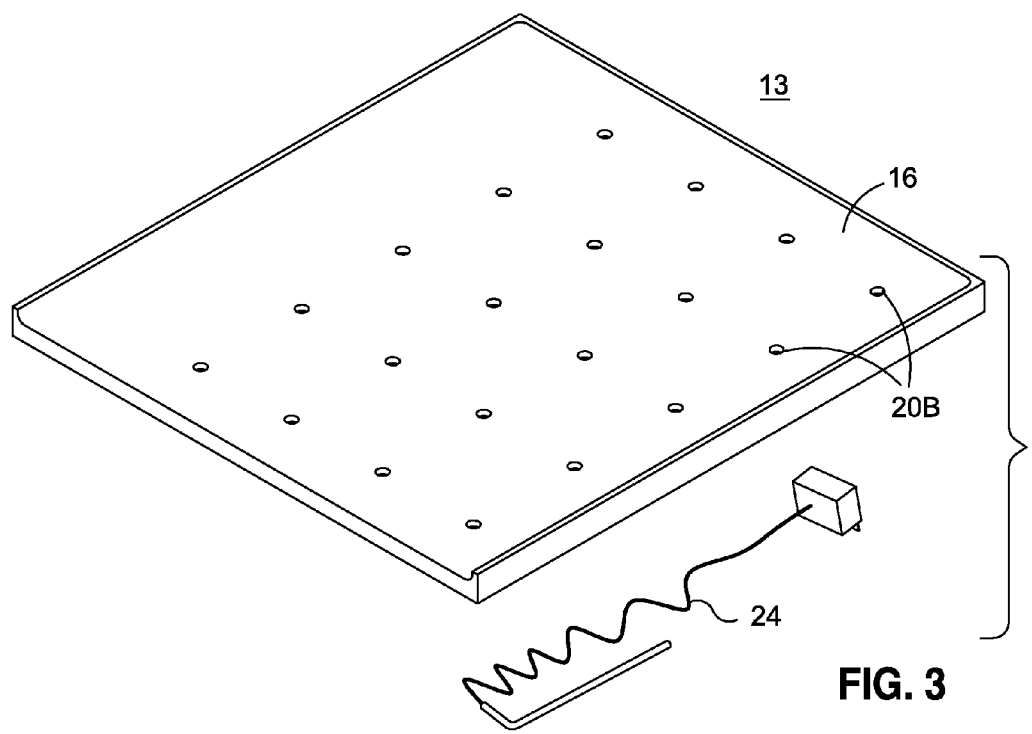
FIG. 3 is an exploded view the heat transfer surface.

FIG. 1 illustrates an apparatus for toasting split bread products such as rolls, buns and other bread products. For ease of reference, such various bread products are collectively referred to as buns herein, except where distinctions of size or shape are noted. Toasting apparatus 10 includes a housing 11 and a griddle 13. The griddle 13 may be heated by various means, such as by electrical heating conduits 24 (shown at FIG. 3) disposed in the body of the griddle 13, or disposed in a separate heating element that is in thermal communication with griddle 13. The temperature of the griddle upper surface 16 may be regulated by means of heat control system 19, disposed within housing 11. As explained in more detail below, the pedestals 15 are detachable are magnetically coupled to and detachable from the griddle upper surface 16, by use of magnetic coupling elements formed in the upper surface 16 and in the pedestals 15. In one preferred embodiment, magnetic coupling elements 22A, are formed of magnetic material, are disposed in the pedestals and magnetic coupling elements 22B, formed in the heated surface 16, are formed of magnetically attracted materials. However, as one of ordinary skill will recognize, the magnetic materials may alternatively be disposed in the heated surface 16, and the magnetically attracted material disposed in the pedestals 15. Moreover, where the pedestals or the heated surfaced are formed of magnetically attracted materials, then there would be no need for separate magnetically attracted materials.

Figure 2:
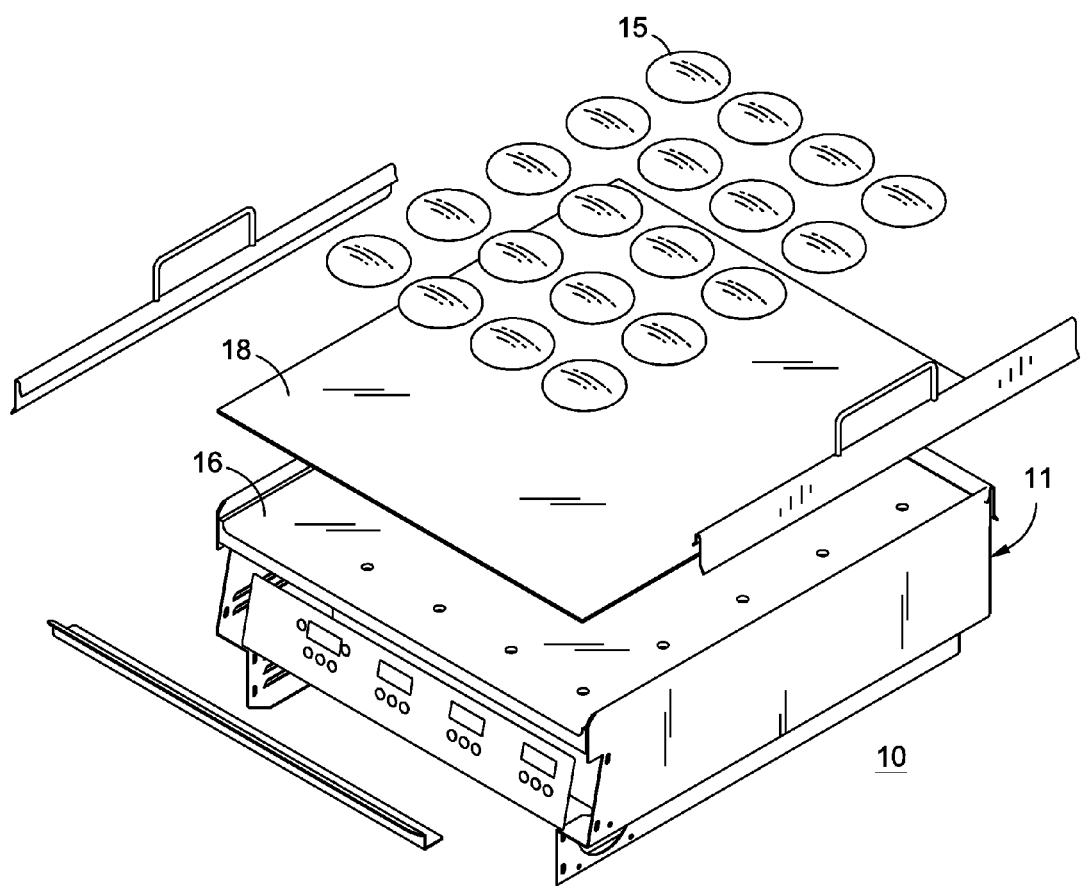
FIG. 2 is an exploded view of the apparatus shown at FIG. 1.

FIGS. 1 and 2 also depicted non-stick layer, or surface 18, disposed intermediate the pedestals 15 and the heated surface 16. The use of non-stick surface 18 facilitates cleaning of the apparatus. In practice, the pedestals 15 may be removed from non-stick surface 18, which then may be readily cleaned, either while it remains on the heated surface 16, or after removal from heated surface 16. Removal of the non-stick layer 18 also facilitates cleaning of the heated surface. The pedestals may also be readily cleaned after removal from the non-stick surface 18.

In one preferred embodiment, non-stick surface 18 is formed of materials such as Teflon®, or material which allows communication of heat from the heated surface 16 to the pedestal 15.

As one of ordinary skill will recognize, the invention may be implemented without the use of the non-stick surface 18, though its inclusion facilitates cleaning, as described above.

As explained in more detail below, the pedestals 15 may be formed in different shapes and sizes depending upon the particular bread product to be toasted, whether a top and/or bottom portion of the bun is to be toasted, and other factors effecting the contour of the split bread product.

The pedestal 15 is shaped to provide abutting support to the bun, along the cut surfaces of the bun.

As previously noted, efforts to toast or sear the inside surface of buns by simply placing the product on a flat heated surface have generally produced less than desirable results. Most commonly, the edge portions of the bun become toasted while the inside surface remains soft and non-caramelized. From experimentation, it appears that the cut surface of the bun may contract after the product is split, whereas the edge portions either do not contract, or contract to a lesser degree. Presumably edge portions of the bun resist contraction due to the crustier nature of the outer surface, which may be attributed to the Maillard reaction which occurs when the bread product is baked. This contraction appears more pronounced in the top portion of the bun, which is typically less dense. The bottom portion of the bun is typically denser and the bottom cut surface appears to typically exhibit less contraction along the cut line.

As a result of contraction of the body of the bun top portion, the top cut surface of the bun commonly becomes slightly arcuate along the cut line. While the extent of the arcuate profile is limited, it may be sufficient to make it difficult to caramelize the cut surface of the bun top portion without distorting the appearance and texture of the bun. The present invention is directed to an apparatus and method to reliably caramelize the inner surfaces of buns without the penalties associated with forcing the bun to lie flat on a griddle surface.

Figure 4A:
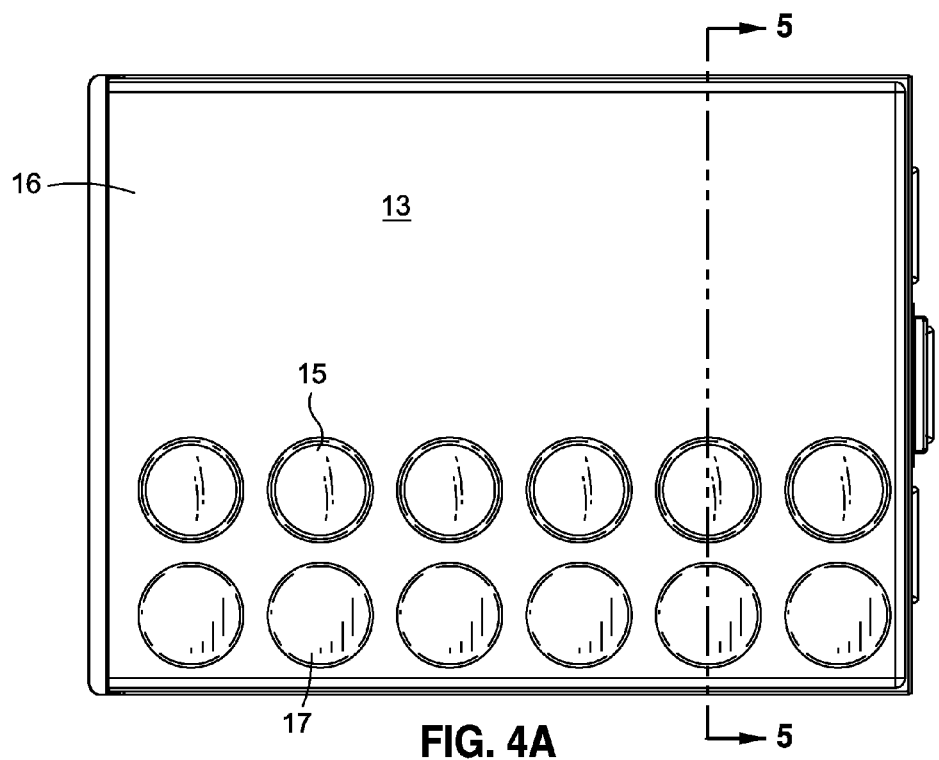
FIG. 4A is a top view of a heated surface including exemplary pedestals for caramelizing round buns or rolls.

FIG. 5 provides a cross-sectional view of the griddle 13, shown at FIG. 4A, including pedestals 15, 17. As shown at FIG. 5, the round pedestals 15, 17 are preferably magnetically coupled to the griddle 13 via magnetic coupling elements 22A, 22B. The magnetic coupling elements secure the pedestals to the heated surface 16. The magnetic attraction between coupling elements 22A, 22B extends through the non-stick layer 18, disposed therebetween. This allows heat transfer between the pedestals and the griddle 13. However, it is to be understood that alternate embodiments of the invention may be implemented wherein raised surface portions 15, 17 may be otherwise engaged to and in thermal communication with griddle 13.

Pedestals 15, 17 define upper contact surfaces 43, 47, and body portions 45, 49, respectively. In the presently preferred embodiment the pedestals 15, 17, are formed to be approximately 3.7 inches wide (diameter) and extend approximately 0.38 inches above the griddle upper surface 16. The arcuate contact surface 43 has a vertical rise of approximately 0.19 inches (radius approximately 9.71 inches). The upper contact surface 47 is shown as substantially flat. However, as described below, the contact surface 47 may also be formed to include an arcuate surface portion similar to that shown at FIG. 4A, wherein the vertical rise of the arcuate portion is less, e.g. 0.1 inches (radius approximately 14.5 inches).

As shown in FIG. 6, pedestal 15 preferably defines an arcuate contact surface 43, having a curved upper edge portion 31, and a reverse curved lower edge portion 33, extending thereabout. The space between the curved upper edge portion 31 and the reverse curved lower edge portion 33 allows for edge portion 35 of bun top portion 20a to extend beyond contact surface 43. As a result, contact surface 43 is in abutting engagement to cut surface 51 of bun top portion 20a, notwithstanding contraction of the body 55 when the bun is sliced.

While FIG. 6 shows the preferred construction where the bun top portion extends beyond the contact surface 43, it is to be understood that in other embodiments the contact surface 43 may be coextensive with or wider than the bun cut surface 51.

FIG. 7 illustrates contour of pedestal 17 as substantially flat, i.e. less arcuate than the arcuate contour shown in FIG. 6. As shown therein, pedestal 17 includes contact surface 47, formed to receive and abut against cut surface 53 of bun lower portion 20b. As indicated above, the body 57 of bun lower portion 20b is typically more compressed than the body 55 of bun upper portion 20a. As noted above, the more compressed body has not been found to assume an arcuate shape along the cut line when the bun is split. As such, a slightly arcuate or flat surface has been found to be useful to caramelize the cut surface 53 of the bun lower portion 20b. It should be noted, however, that pedestals 15, 17 may both be formed to define an arcuate contact surface, such as surface 43, including curved upper and lower edge portions extending thereabout. Such arcuate contact surfaces have been found to be effective for caramelizing the cut surfaces of both top and bottom portions.

Moreover, insofar as the cut surface 53 of the bun lower portion 20b tends to be less arcuate or flat, the contact surface 47 may be substantially coextensive with the bun cut surface 53, where the bun edge portions are not so raised as to space the cut surface 53 from the contact surface 47. However, it is to be understood that the contact surface 47 may alternately be longer or shorter than the length of the bun cut surface 53. Edges 37, 39 of the raised surface portion 17 are preferably curved as shown, and separated by vertical side wall 41.

In practice, the bun top and/or bottom portions may be seated on the pedestals 15, 17 using slight downward pressure, by hand, along with a twisting motion. Such a practice has been found to be useful to ensure that the bun cut surface abuts against the contact surface of pedestals 15, 17. In some cases a user may prefer that the outer perimeter of the bun extends over and engages the edges of the pedestals, to more securely maintain the bun in place. However, the process of manually seating the bun on the pedestals has been found to require little pressure, which may be localized around the perimeter of the bun. The pressure is released before toasting, and has not been found to distort the appearance or texture of the bun.

The invention allows for the pedestals 15, 17 to be shaped and sized in accordance with the shape, size and characteristics of the product to be toasted. Insofar as in commercial usage the shape of the bread products used are typically consistent and limited, the permanent or semi-permanent nature of the shapes of the pedestals 15, 17 does not appear to be significantly limiting in commercial application. Further, it is anticipated that users, such as fast food restaurants, may specify particular shapes, heights and procedures for seating the buns which are tailored to their particular bread products, their food production techniques, and the preferred food product characteristics that they wish to achieve.

Figure 9:
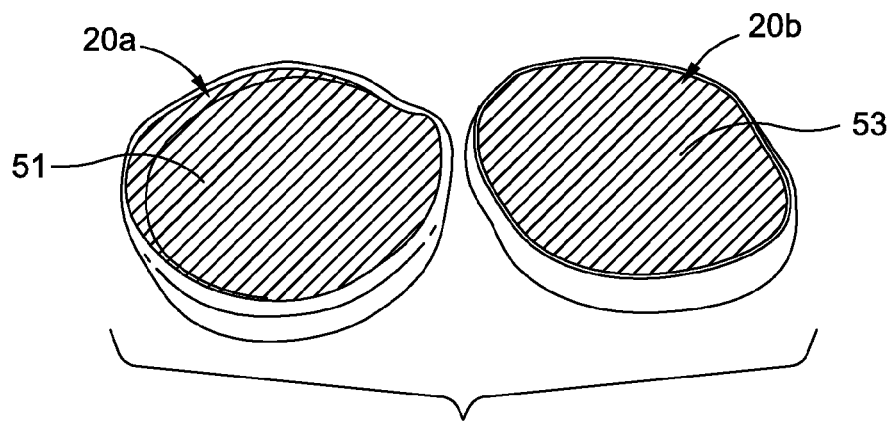
FIG. 9 is an illustration of inner surface portions of buns that have been caramelized in accordance with the present invention.

FIG. 9 shows a bun, including bun top portion 20a and bun bottom portion 20b, after toasting in accordance with the present invention. As shown therein cut surfaces 51 and 53 are toasted along substantially the entire surface thereof.

Figure 10:
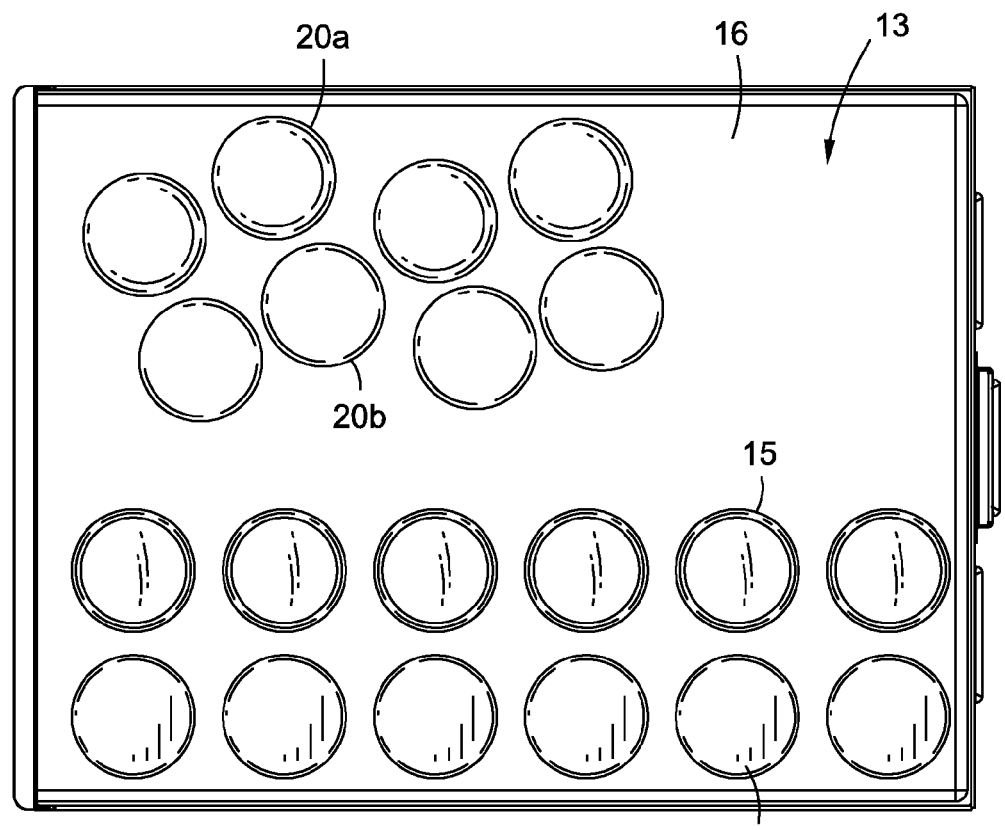
FIG. 10 is an illustration of the heated surface having different shaped pedestals and a flat surface area for warming the buns after caramelization.

FIG. 10 shows a plurality of split buns which have been toasted on pedestals 15, 17 (e.g. for about 1½ minutes), and moved to flat surface area 16 (holding area) of griddle 13. When the split buns are moved to the griddle the buns are typically supported on the griddle by the outer edge portion, and the cut surfaces are spaced from the griddle. As such, the cut surfaces are typically not further caramelized or colored. Moreover, placing the buns on the flat surface area 16, after caramelizing the cut surfaces of the buns, allows for warming of the bun body, e.g. to about 120-140° F., so that the bun will remain warm after sale.

Figure 4B:
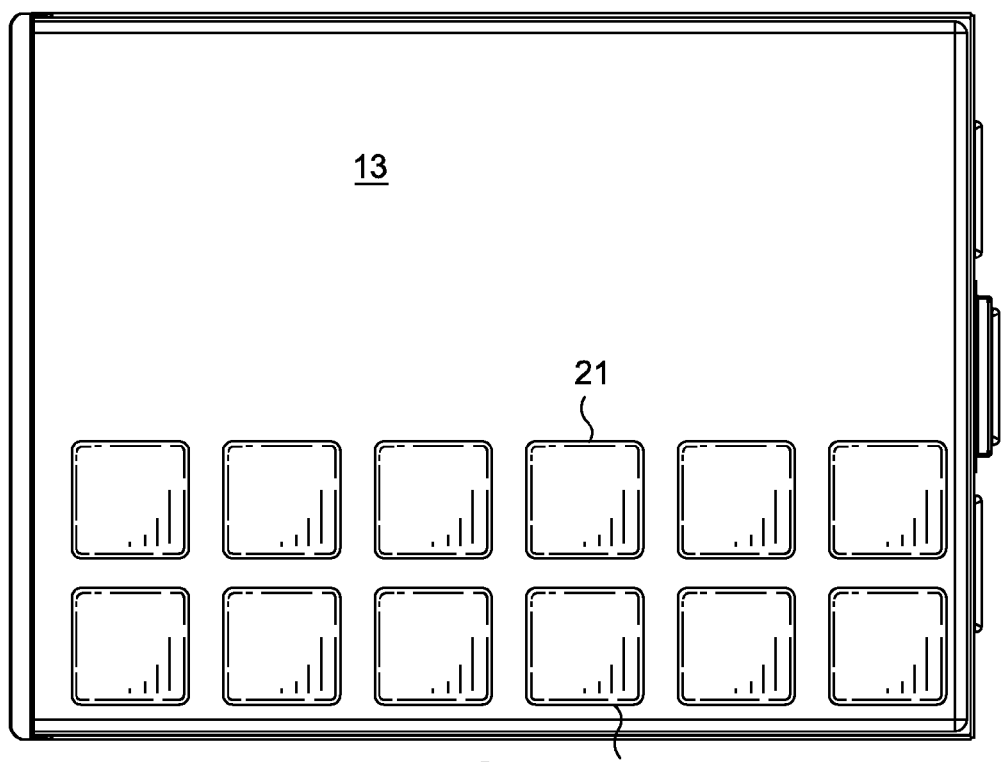
FIG. 4B is a top view of a heated surface including alternate pedestals for caramelizing square buns or rolls.

FIG. 4B shows an alternate implementation wherein the pedestals 21, 23 are formed to have a substantially square shape. Such construction may be useful for square buns, bread and other products.

Figure 4C:
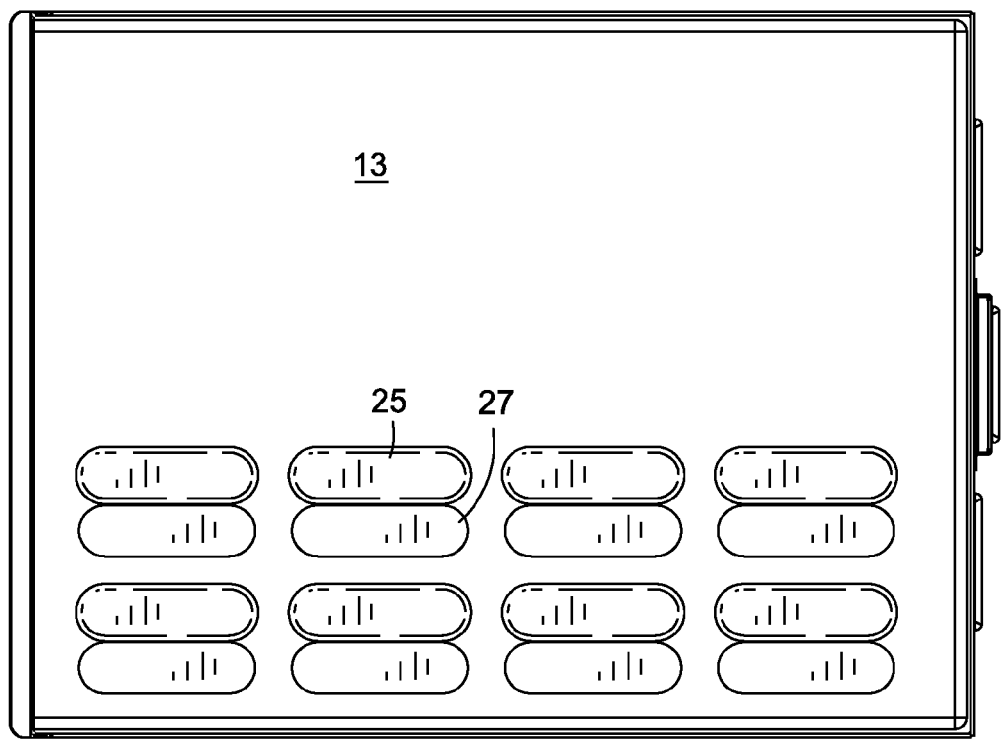
FIG. 4C is a top view of a heated surface including alternate raised pedestals for caramelizing elliptically shaped buns or rolls.
Figure 8A:
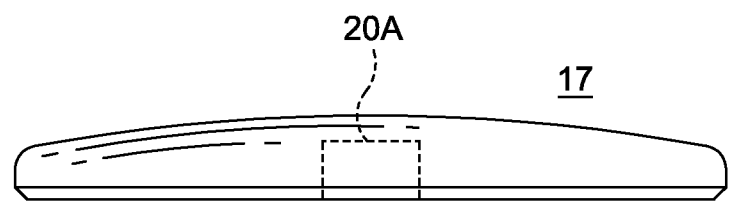
FIG. 8A is a side view of an exemplary pedestal.
Figure 8B:
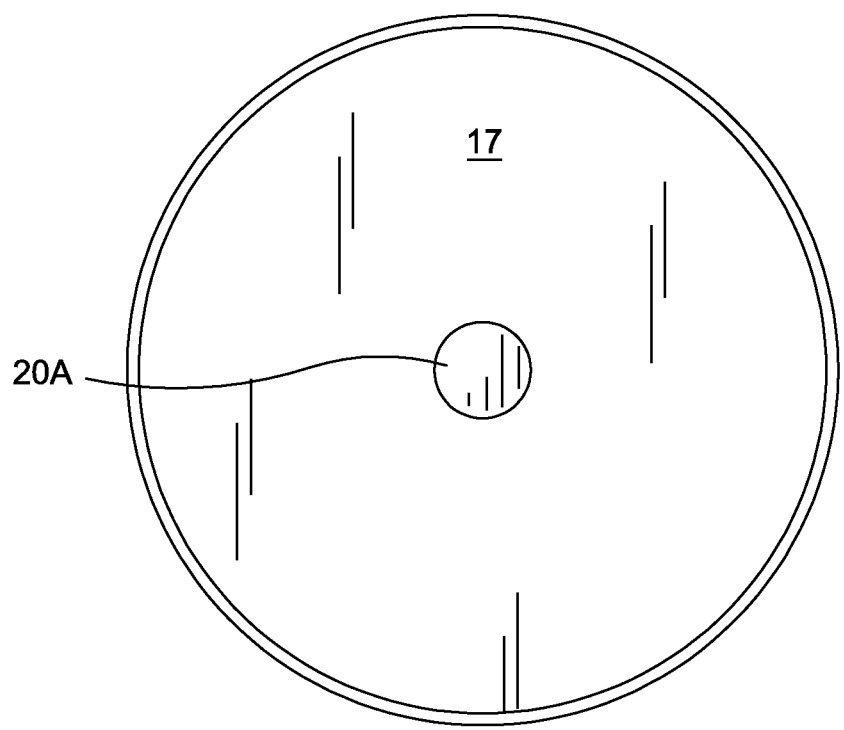
FIG. 8B is a bottom view of an exemplary pedestal.

FIG. 4C illustrates another embodiment wherein the pedestals 25, 27 are formed in the shape of an elongated roll, as may be consistent with the shape of hot dog rolls, hoagie rolls, French bread, etc. Where the top and bottom portions of the elongated roll may contract differently upon splitting, one of the pedestals, e.g. pedestal 25, may be formed to have a more arcuate shape than pedestal 27, as previously described in connection with FIGS. 6 and 7. Additionally, where the buns or other bread product are not completely split before toasting, pedestals 25, 27, may be formed to be substantially contiguous so that the bun can be placed on the pedestals without being completely split and separated.

Accordingly, as indicated above, the present invention is amenable to various modifications and enhancements that allow for toasting of the split surfaces of various bread products. The pedestals may be formed to conform to the size and contour of the split bread product in use. Further, the desired degree of caramelization may be varied by adjusting temperature of the griddle and by the manner in which the bread product is seated on the pedestals. These and other objects and advantages may be accomplished while preserving the fresh from the bakery flavor of the body of the toasted bread product, even where the meat or vegetables have significant moisture content.

As explained in more detail below.

What is claimed is:

1. An apparatus for caramelizing a cut surface of a split bread product comprising:
    a substantially flat, heatable surface;
    at least one pedestal magnetically coupled to and in heat transfer communication with the flat surface and extending upwardly therefrom, the pedestal defining an upper contact surface for receiving and supporting the split bread product;
    the contact surface being formed to conform to the contour of the cut surface of the split bread product, to apply heat directly to the cut surface to caramelize the cut surface; and
    wherein the heated surface includes a plurality of magnetic coupling elements disposed therein, the coupling elements being magnetically attractable to the pedestal, to facilitate magnetic coupling therebetween.

2. The apparatus as recited in claim 1 wherein the contact surface defines an arcuate surface.

3. The apparatus as recited in claim 2 wherein the pedestal defines an outer perimeter having a curved upper edge extending thereabout.

4. The apparatus as recited in claim 3 wherein the pedestal defines an outer perimeter having a reverse curved lower edge extending thereabout.

5. The apparatus as recited in claim 1 wherein the contact surface defines a substantially flat surface.

6. The apparatus as recited in claim 5 wherein the pedestal defines a substantially vertical side wall extending thereabout.

7. The apparatus as recited in claim 2 wherein the pedestal defines a circular perimeter.

8. The apparatus as recited in claim 7 wherein the circular perimeter has a diameter that is substantially equal to the split bread product diameter.

9. The apparatus as recited in claim 7 wherein the circular perimeter has a diameter that is less than the split bread product diameter.

10. The apparatus as recited in claim 1 wherein the pedestal substantially defines the perimeter of a circular bun.

11. The apparatus as recited in claim 1 wherein the pedestal substantially defines the perimeter of a square bun.

12. The apparatus as recited in claim 1 wherein the pedestal substantially defines the perimeter of an elongated roll.

13. The apparatus as recited in claim 1 further comprising first and second pedestals;
the first pedestal having a first arcuate contact surface;
the second pedestal having a second arcuate contact surface;
the first arcuate contact surface being formed to have a more arcuate contour than the second arcuate contact surface.

14. The apparatus as recited in claim 1 wherein the first contact surface substantially conforms to the contour of the cut surface of a bun top portion.

15. The apparatus as recited in claim 1 wherein the contact surface substantially conforms to the contour of the cut surface of a bun top portion, within the bun perimeter.

16. The apparatus as recited in claim 1 wherein the second contact surface substantially conforms to the contour of the cut surface of a bun bottom portion.

17. The apparatus as recited in claim 1 wherein the raised surface portion contact surface conforms to the contour of the cut surface of a bun bottom portion, within the bun perimeter.

18. The apparatus as recited in claim 1 where in the contact surface substantially conforms to the contour of the cut surface of an elongated roll top portion.

19. The apparatus as recited in claim 1 wherein the contact surface conforms to the contour of the cut surface of an elongated roll top portion, within the roll perimeter.

20. The apparatus as recited in claim 1 where in the contact surface substantially conforms to the contour of the cut surface of an elongated roll bottom portion.

21. The apparatus as recited in claim 1 wherein the contact surface conforms to the contour of the cut surface of an elongated roll bottom portion, within the roll perimeter.

22. The apparatus as recited in claim 1 wherein the pedestal defines a cross section having a height that increases from the outer perimeter towards the center of the raised surface portion.

23. The apparatus as recited in claim 1 wherein the contact surface is spaced from the heated surface to facilitate engagement and retention of the bun on the raised surface portion.

24. The apparatus as recited in claim 9 wherein the arcuate contact surface is spaced from the heated surface to facilitate abutment of the contact surface with the cut surface of the split bread product, and engagement of the raised surface portion perimeter within the split bread product perimeter.

25. The apparatus as recited in claim 1 wherein the pedestal at is detachable from the heated surface.

26. The apparatus as recited in claim 1 further comprising a housing for receiving and supporting the heatable surface, and a heat control system disposed within the housing, for regulating the temperature of the heatable surface.

27. The apparatus as recited in claim 1 further comprising a non-stick layer disposed intermediate the heated surface and the pedestal.

28. The apparatus as recited in claim 27 wherein the non-stick layer is formed as a layer of flexible material that allows heat transfer between the heated surface and the pedestal.

29. The apparatus as recited in claim 28 wherein the non-stick layer allows magnetic coupling between the heated surface and the pedestal.

* * * * *